(12) United States Patent
Lee et al.

(10) Patent No.: US 7,330,446 B2
(45) Date of Patent: Feb. 12, 2008

(54) CLOSED-LOOP POWER CONTROL METHOD FOR A CODE-DIVISION MULTIPLE-ACCESS CELLULAR SYSTEM

(75) Inventors: Chieh-Ho Lee, Hsinchu (TW); Chung-Ju Chang, Taipei (TW); Chung Hsin Lu, Taipei (TW)

(73) Assignee: Industrial Technology Research Institute (TW)

( * ) Notice: Subject to any disclaimer, the term of this patent is extended or adjusted under 35 U.S.C. 154(b) by 1016 days.

(21) Appl. No.: 09/956,785

(22) Filed: Sep. 21, 2001

(65) Prior Publication Data

US 2003/0058821 A1    Mar. 27, 2003

(51) Int. Cl.
*H04B 7/00* (2006.01)
(52) U.S. Cl. ........................ 370/318; 455/522
(58) Field of Classification Search ................. 370/252, 370/335, 342, 320, 522, 311; 455/522, 127.1, 455/127.2, 69
See application file for complete search history.

(56) References Cited

U.S. PATENT DOCUMENTS

| | | | |
|---|---|---|---|
| 5,056,109 A * | 10/1991 | Gilhousen et al. ........... 370/342 |
| 5,257,283 A | 10/1993 | Gilhousen et al. |
| 5,264,119 A | 11/1993 | Gilhousen et al. |
| 5,297,161 A * | 3/1994 | Ling ........................... 375/130 |
| 5,430,889 A | 7/1995 | Hulbert et al. |
| 5,559,790 A | 9/1996 | Yano et al. |
| 5,566,165 A | 10/1996 | Sawahashi et al. |
| 5,574,984 A * | 11/1996 | Reed et al. ................... 455/522 |
| 5,603,096 A | 2/1997 | Gilhousen et al. |
| 5,655,220 A | 8/1997 | Weiland et al. |
| 5,963,583 A | 10/1999 | Davidovici et al. |
| 6,175,744 B1 * | 1/2001 | Esmailzadeh et al. ....... 455/522 |
| 6,252,865 B1 * | 6/2001 | Walton et al. ............... 370/335 |
| 6,396,867 B1 * | 5/2002 | Tiedemann et al. .......... 375/141 |
| 6,449,463 B1 * | 9/2002 | Schiff ........................... 455/69 |
| 6,546,260 B2 * | 4/2003 | Esmailzadeh et al. ....... 455/522 |
| 6,603,746 B1 * | 8/2003 | Larijani et al. .............. 370/318 |
| 6,603,980 B1 * | 8/2003 | Kitagawa et al. ........... 455/522 |

(Continued)

OTHER PUBLICATIONS

Lau and Tam, Novel SIR Estimation-based Power Control in a CDMA Mobile Radio System Under Multipath Environment, Jan. 2001, IEEE Transactions on Vehicular Technology, vol. 50, No. 1, p. 314.*

(Continued)

*Primary Examiner*—Kwang Bin Yao
*Assistant Examiner*—Warner Wong
(74) *Attorney, Agent, or Firm*—Clark A. Jablon; Akin Gump Strauss Hauer & Feld LLP

(57) ABSTRACT

Methods and apparatuses for a closed-loop power control in a code-division multiple-access communication system wherein both received signal quality and communication channel quality are used to determine appropriate transmitter power, and transmission may be suspended when a channel quality metric, such as by short-term fading, degrades below a preset minimum threshold, or when a commanded transmitter power exceeds a preset maximum threshold, and wherein the transmitter power is controlled to mitigate fading effects so that received signal quality metric, such as by the average received signal power or by the average received SIR over a control cycle, approaches a preset desired level, and by momentarily suspending a remote terminal, overall system capacity and throughput may be enhanced.

20 Claims, 13 Drawing Sheets

U.S. PATENT DOCUMENTS

| | | | |
|---|---|---|---|
| 6,697,634 B1* | 2/2004 | Hayashi | 455/522 |
| 6,778,511 B1* | 8/2004 | Magnus et al. | 455/522 |
| 6,807,164 B1* | 10/2004 | Almgren et al. | 370/342 |
| 6,831,910 B1* | 12/2004 | Moon et al. | 370/342 |
| 7,277,721 B2* | 10/2007 | Okumura et al. | 455/522 |
| 2002/0021682 A1* | 2/2002 | Ariyoshi et al. | 455/522 |
| 2004/0066772 A1* | 4/2004 | Moon et al. | 370/342 |

OTHER PUBLICATIONS

A.J. Viterbi, "Wireless digital communication: a view based on three lessons learned," IEEE Comm. Magazine, vol. 29, No. 9, pp. 33-36, Sep. 1991.

J.G. Proakis, Digital communications, 3rd ed. New York: McGraw-Hill, pp. 849-854, 1995.

T.S. Rappaport, Wireless communications principles and practice, New Jersey: Prentice-Hall, pp. 519-533, 1996.

A.J. Viterbi et al., "On the capacity of a cellular CDMA system," IEEE Trans. on Vehicular Technology, vol. 40, No. 2, pp. 303-312, May 1991.

B. Hashem and E. Sousa, "a combined power/rate control scheme for data transmission over a DS/CDMA system," IEEE VTC'98, vol. 2, pp. 1096-1100.

B. Hashem and E. Sousa, "Performance of cellular DS/CDMA systems employing power control under slow Rician/Rayleigh fading channels," IEEE ISSSTA, vol. 2, pp. 425-429, 1998.

D. Kim, "Rate-regulated power control for supporting flexible transmission in future CDMA mobile networks," IEEE J. Selected Areas on Comm. vol. 17, No. 5, pp. 968-977, May 1999.

Sang Wu Kim and Andrea J. Goldsmith, "Truncated Power Control in Code-Division Multiple-Access Communications", IEEE Trans. on Vehicular Technology, vol. 49, No. 3, May 2000.

Chieh-Ho Lee and Chung-Ju Chang, "An Equal-Strength/Power-Suspended Power Control Scheme for a DS/CDMA Cellular System," IEEE Trans. on Vehicular Technology, pp. 550-556, Sep. 24, 2000.

* cited by examiner

CLOSED-LOOP POWER CONTROL METHOD FOR A CODE-DIVISION MULTIPLE-ACCESS CELLULAR SYSTEM

DESCRIPTION OF THE INVENTION

1. Field of the Invention

The present invention relates generally to systems and methods for power control in wireless communication systems and, in particular, to a system and method for controlling channel fading effects in a code-division multiple-access communication system.

2. Background of the Invention

A code-division multiple-access (CDMA) communication technique provides several advantages for wireless, or cellular, communications. One advantage of a CDMA wireless communication system is frequency reuse, in that it provides high spectrum efficiency, yields maximum flexibility in resource assignment, and allows implementation of soft handover algorithms.

In a CDMA wireless communication system, one or more remote terminals may simultaneously transmit messages over a single channel because each remote terminal has a unique spread-spectrum pseudo-noise (PN) code. Each PN code provides a code channel conceptually similar to a frequency channel in Frequency Division Multiple Access (FDMA) or a time-slot channel in Time Division Multiple Access (TDMA). Within each cell of a CDMA wireless communication system, a base station transmits and receives signals from various remote terminals. Transmissions from the base station to the remote terminals are known as downlink transmission, and transmission from the remote terminals to the base station are known as uplink transmission.

Downlink code channels between the base station and remote terminals may be treated as orthogonal because downlink transmissions may be synchronized. However, it may be impractical to synchronize uplink transmissions because the remote terminals may be scattered around the base station at varying distances. The strength of a signal, or signal power, received from a remote terminal located nearer the base station would generally be larger than the signal power received from a remote terminal located farther away. Therefore, the differences in the signal power would cause multiple-access interference in uplink transmissions at a quantity proportional to the signal strength of each uplink signal. In other words, a remote terminal located nearer the base station or one having a stronger signal power may cause greater interference than one located further away or having a weaker signal. Thus, a remote terminal located nearer the base station or one having a stronger signal may achieve better communication quality as compared to a remote terminal located farther from the base station or one having a weaker signal. This phenomenon is generally known as near-far problem, which may limit the capacity of a CDMA wireless system.

Channel fading in a CDMA wireless system may be modeled as two statistically independent components: long-term fading, such as path loss and shadowing, and short-term fading, such as multi-path fading. In general, conditions of an uplink channel correlate with those of a downlink channel for long-term fading. Thus, information regarding the conditions of a downlink channel may be used to address long-term fading of an uplink channel. However, there is generally no correlation between conditions of uplink and downlink channels for short-term fading.

The effects of channel fading may be minimized by equalizing the signal power of the interfering signals with a power control system that generally includes an open-loop power control system that compensates for long-term fading, and a closed-loop power control system that compensates for short-term fading. The open-loop power control system compensates for long-term channel fading by holding a long-term average received signal power at constant, and the near-far problem is resolved.

To compensate for short-term fading, a closed-loop control system needs to achieve acceptable received signal quality. After having compensated for long-term channel fading, a closed-loop power control system receiver provides information regarding a received signal quality to a transmitter to control transmitter power in response to short-term fading. Several closed-loop power control systems have been proposed. In an equal-strength power control system, known as a perfect power control system, the power of a transmitted signal from a remote terminal is adjusted in order to maintain at constant the power level of a received signal at the base station.

Another known closed-loop power control system is an equal-strength/power-limited power control system. Such a system is similar to the equal-strength power control scheme, except that the maximum transmitter power of a remote terminal is limited to the following:

$$\frac{1}{X_0} \cdot E\{SF(t)\}, \text{ where } SF(t) < X_0.$$

$SF(t)$ represents short-term fading, $X_0$ represents a preset threshold, and $E\{\cdot\}$ is an expected-value operator.

Yet another known closed-loop power control system is an equal-strength/power-limited/rate-adapted power control system. It, too, is similar to the equal-strength/power-limited power control system, except that a transmission rate of the remote terminal is adapted according to the following:

$$SF(t) \cdot RATE_0/X_0 \text{ where } SF(t) < X_0,$$

$RATE_0$ is a default transmission rate. The signal-to-interference ratio (SIR) for each received bit of information remains constant when $SF(t) < X_0$.

SUMMARY OF THE INVENTION

In accordance with the invention, there is provided A method for controlling transmitter power of a signal in a code-division multiple-access wireless communication system having a communication channel that includes receiving the signal, transmitting the signal when a first quality metric of the communication channel exceeds a preset threshold, and suspending transmission of the signal when the first quality metric is less than the preset threshold.

In one aspect of the invention, the step of transmitting the signal further comprises a step of receiving power control commands having values other than ones indicating the step of suspension of transmission.

In another aspect of the invention, the power control commands are determined according to a second quality metric of a received signal and the first qualify metric exceeds a preset threshold for adjusting transmitter power of the signal.

In yet another aspect, the power control commands are determined according to a second quality metric of a received signal and the first qualify metric exceeds a preset threshold for adjusting transmitter power of the signal.

In still another aspect, the step of suspending transmission further comprises a step of receiving a command, wherein the command is a predetermined value indicating suspension of transmission.

Also in accordance with the present invention, there is provided a method for controlling a transmitter power of a signal in a code-division multiple-access wireless communication system having a communication channel includes receiving the signal, transmitting the signal when a commanded transmitter power is less than a preset value, and suspending transmission of the signal when the commanded transmitter power is greater than the preset value.

Further in accordance with the present invention, there is provided a method for strength-based transmitter power control in a code-division multiple-access wireless communication system that includes receiving a signal, estimating a received power of the signal, estimating an average received power of the signal over a control cycle, estimating an average short-term fading over the control cycle, and generating a command for adjusting transmitter power or suspending signal transmission based on the estimated average received power and the estimated average short-term fading.

Additionally in accordance with the present invention, there is provided a method for signal-to-interference ratio-based power control for controlling a transmitter power in a code-division multiple-access wireless communication system that includes receiving a signal, estimating a received power of the signal, estimating a long-term average interference power affecting the received signal, estimating a signal-to-interference ratio based on the estimated received power and the estimated long-term average interference power, estimating an average short-term fading over a control cycle, and generating a command for adjusting the transmitter power or suspending signal transmission based on an average of the estimated signal-to-interference ratio and the estimated average short-term fading.

Additionally in accordance with the present invention, there is provided a method for controlling a transmitter power in a code-division multiple-access wireless communication system having a communication channel that includes receiving a signal, setting a predetermined value for a command to indicate suspended transmission, setting the command to a first value when a first quality metric of the received signal exceeds the preset desired level and a second quality metric of the communication channel exceeds the preset threshold, wherein the first value is not equal to the predetermined value, setting the command to a second value when the first quality metric is less than the preset desired level and the second quality metric exceeds the preset threshold, wherein the second value is not equal to the predetermined value, and setting the command to the predetermined value when the second quality metric is less than the preset threshold.

Further in accordance with the present invention, there is provided a method for controlling a transmitter power in a code-division multiple-access wireless communication system having a communication channel that includes receiving a signal, setting a command to a first value when a quality metric of the received signal is less than a preset desired level, and setting the command to a second value when the quality metric exceeds the preset desired level, wherein the second value is not equal to the first value.

Also in accordance with the present invention, there is provided a transmitter control unit that controls a transmitter power in a code-division multiple-access wireless communication system that includes a multiplier for multiplexing a received power control command and a preset step size, a gain accumulator coupled to the multiplier to receive an output from the multiplier, an amplifier, coupled to the gain accumulator, receiving an input signal and an output of the gain accumulator, and a transmission suspension unit coupled to the amplifier for determining whether to suspend transmission based on the received power control command or a commanded transmitter power level, wherein the commanded transmitter power level is an output of the amplifier.

In one aspect of the invention, the transmitter control unit further comprises a switch connecting the power control command to the multiplier, the switch connecting the power control command to the transmission suspension unit upon a determination to suspend transmission.

Further in accordance with the present invention, there is provided a receiver control unit for a strength-based power control in a code-division multiple-access wireless communication system that includes a first estimator for estimating an average power of a received signal over a control cycle, a second estimator for estimating an average short-term fading over the control cycle, and a power control command unit for generating a power control command based on the estimated average power of the received signal, the estimated average short-term fading, a preset desired received power level, and a preset size of an adjustment step for a transmitter power.

Also in accordance with the present invention, there is provided a receiver control unit for a signal-to-interference ratio-based power control in a code-division multiple-access wireless communication system that includes a first estimator for estimating a received power of an input signal and a long-term average interference power to determine an estimated signal-to-interference ratio, an averaging unit for determining an average of the estimated signal-to-interference ratio value over a control cycle to determine an estimated average signal-to-interference ratio, a second estimator for estimating an average short-term fading over a control cycle, and a power control command unit for generating a power control command based on the estimated average short-term fading, the estimated average signal-to-interference ratio, a preset desired signal-to-interference ratio and a preset size of an adjustment step for the transmitter power.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Methods and apparatuses are presented for closed-loop power control in a code-division multiple-access communication system wherein both received signal quality and channel quality are used to determine appropriate transmitter power, and transmission may be suspended when a channel quality metric, such as short-term fading, degrades below a preset minimum threshold, or when a commanded transmitter power exceeds a preset maximum threshold. The transmitter power may also be controlled to mitigate fading effects so that the received signal power is maintained at a constant level. In addition, by momentarily suspending a remote terminal, overall system capacity and throughput may be enhanced.

Specifically, the present invention provides methods and systems for closed-loop power control in a code-division multiple-access (CDMA) wireless communication system. When either a channel quality deteriorates below a preset threshold, or transmitter power commanded by a receiver exceeds a preset maximum value, the transmitter of the present invention either suspends transmission or transmits with a power sufficient to compensate for short-term fading so that a received signal power level is held at constant. The present invention also provides a method to control transmitter power in a CDMA wireless communication system that transmits signals when a quality metric of a channel exceeds a preset threshold or a commanded transmitter power does not exceed a preset value. The method of the present invention suspends transmission when the quality metric of the channel is less than the preset threshold or the commanded transmitter power exceeds the preset value.

Figure 1:
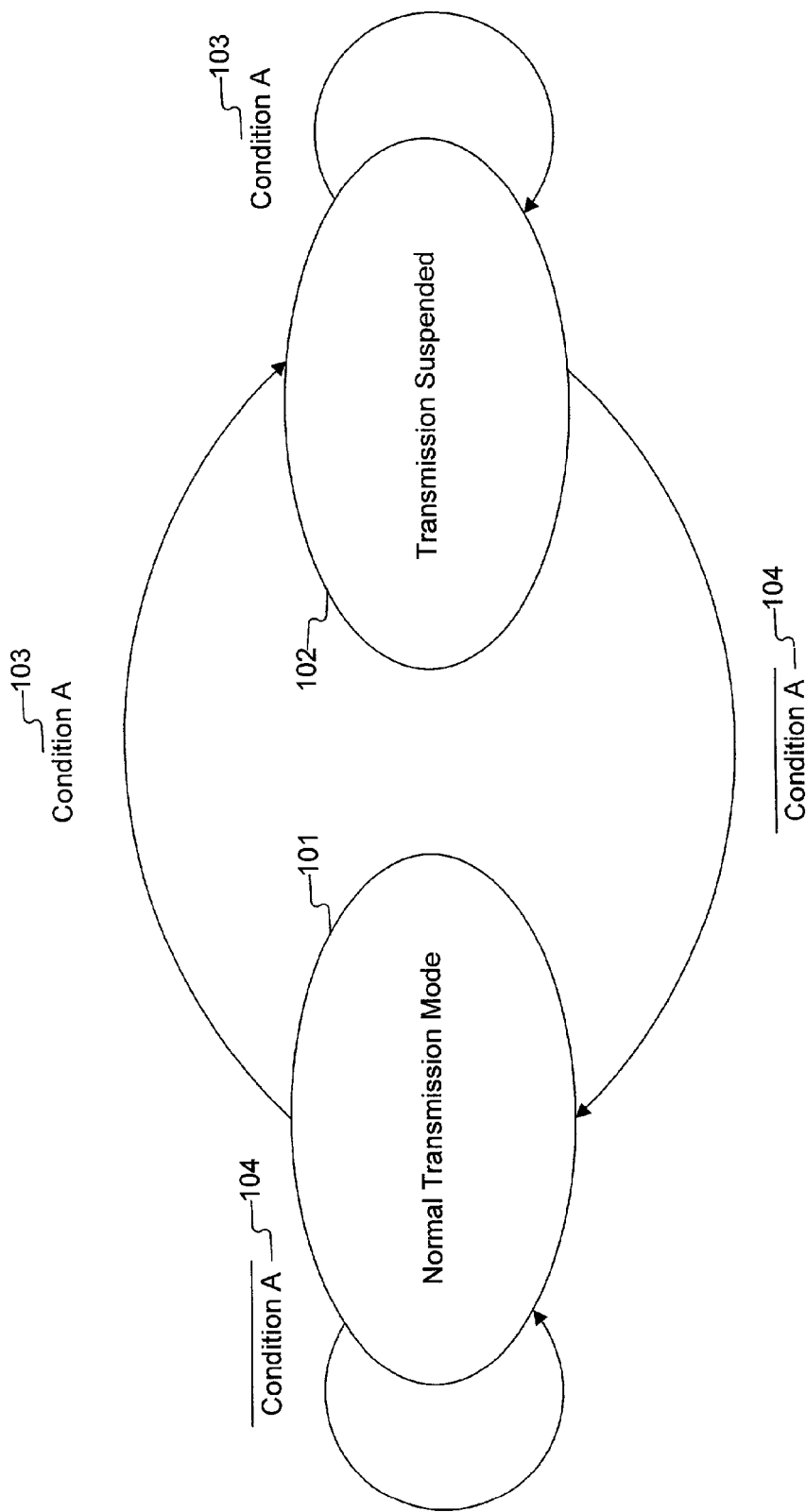
FIG. 1 is a state diagram showing a power control process in accordance with the methods and systems consistent with the present invention.

FIG. 1 is a state diagram showing a power control process in accordance with the methods and systems consistent with the present invention. Referring to FIG. 1, in a normal transmission mode 101, a quality metric of a communication channel meets or exceeds a preset threshold, or a commanded transmitter power does not exceed a preset maximum value. In other words, the commanded transmitter power is equal to or less than the preset maximum value during normal transmission mode 101. The transmitter power is set according to a power control command (CMD). A Condition A 103 occurs when the quality metric of the communication channel fails to meet or exceed the preset threshold, or when the commanded transmitter power exceeds the preset maximum value. An inverse of Condition A 104 occurs when the quality metric of the communication channel meets or exceeds the present threshold, or when the commanded transmitter power does not exceed the preset maximum value. When Condition A 103 occurs, the CDMA wireless system of the present invention switches from normal transmission mode 101 to a transmission suspended mode 102 until the inverse of Condition A 104 occurs.

Figure 2A:
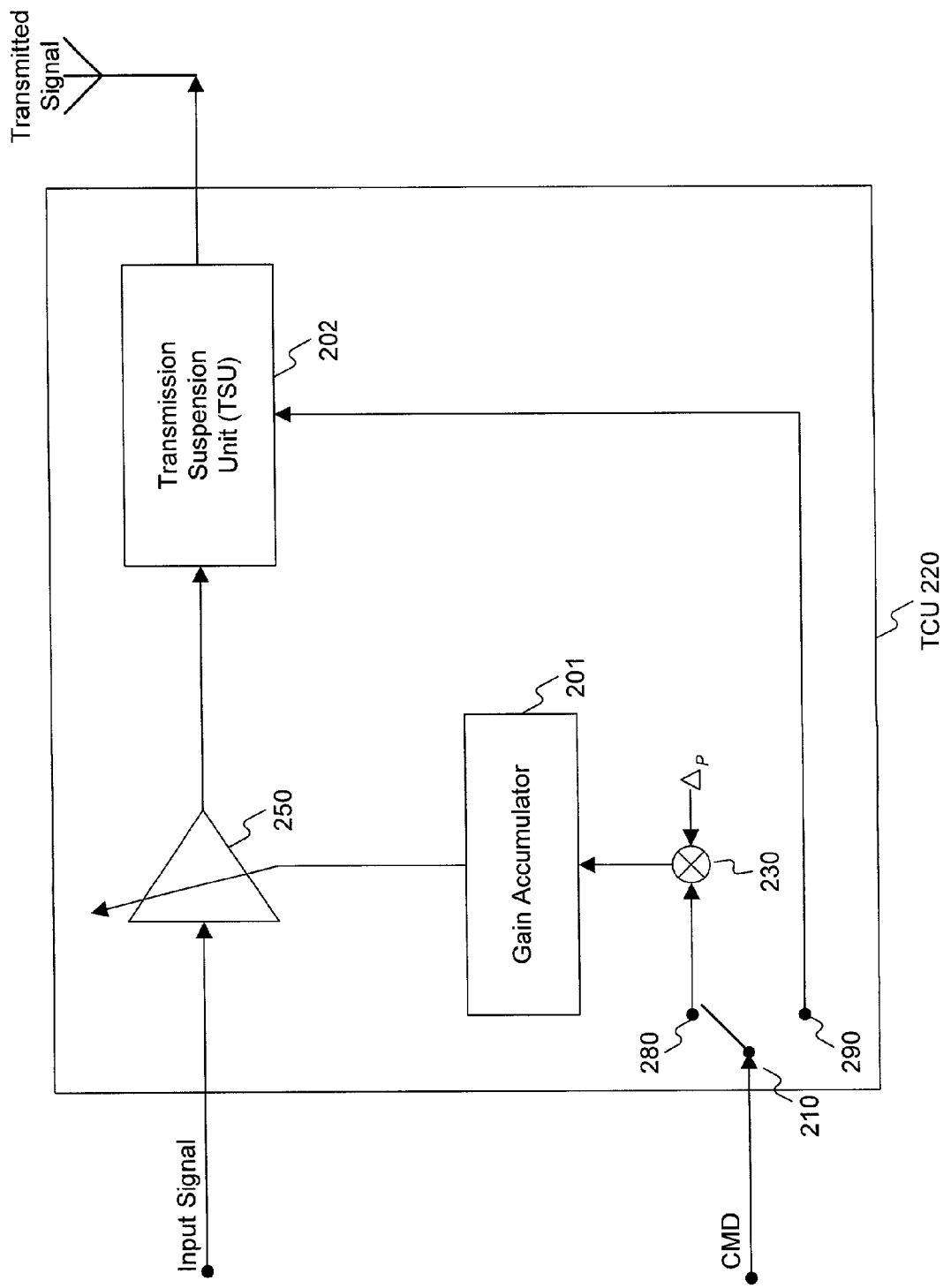
FIG. 2A is a block diagram of an exemplary transmitter control unit for a strength-based power control.
Figure 2B:
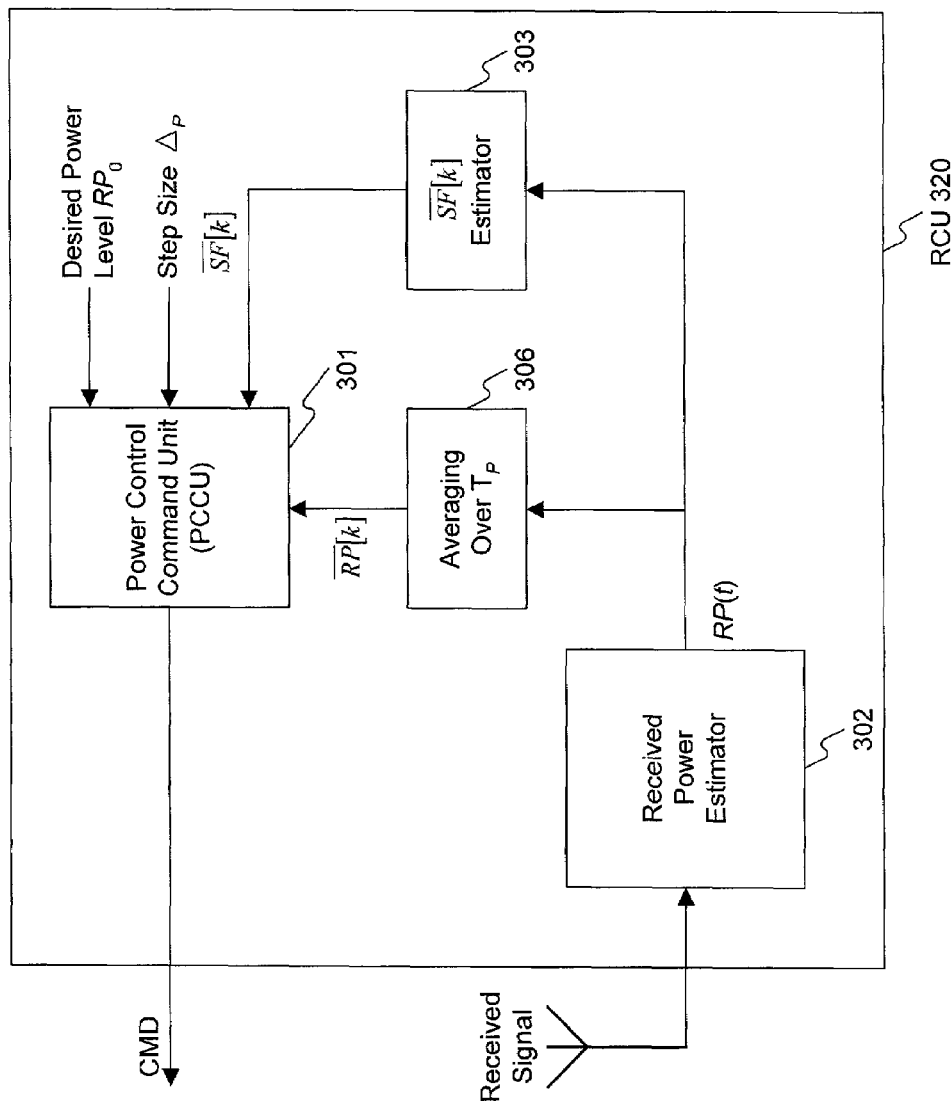
FIG. 2B is a block diagram of an exemplary receiver control unit for a strength-based power control.

FIG. 2A and FIG. 2B are block diagrams of an exemplary transmitter control unit and receiver control unit, respectively, to compensate for short-term fading to which the methods for the closed-loop power control system for a strength-based power control may be implemented in accordance with an embodiment the present invention. Referring to FIG. 2A, a transmitter control unit (TCU) 220 includes a variable-gain amplifier 250 that receives an input signal. Variable-gain amplifier 250 is coupled to a gain accumulator 201 and provides an output to a transmission suspension unit (TSU) 202. TSU 202 outputs a signal, which is then transmitted by an antenna (not numbered). TCU 220 also includes a multiplier 230 that provides an output to gain accumulator 201. TCU 220 receives a power control command (CMD) and functions to adjust transmitter power or suspend transmission of a transmitter in a CDMA wireless communication system (not shown). As discussed hereinafter, the CMD is generated over a $k^{th}$ power control cycle having a period of $T_P$. If the value of the CMD indicates a value other than a predetermined value indicating a transmission suspended mode, a switch 210 switches to a first position 280 and establishes electrical connection between the source of the CMD (not shown in FIG. 2A) and multiplier 230. Multiplier 230 receives the CMD together with a preset step size $\Delta_P$, wherein $\Delta_P$ is the size of an adjustment step (in dB) for the transmitter power. Multiplier 230 provides an output to gain accumulator 201, which provides an input to variable-gain amplifier 250 to adjust the output signal. If the value of the CMD is a predetermined value indicating a suspended transmission mode, switch 210 switches to a second position 290 and establishes electrical connection between the source of the CMD and TSU 202, which determines whether to suspend transmission. The criteria for suspending transmission will be described hereinafter.

Referring to FIG. 2B, a receiver control unit (RCU) 320 includes a received-power estimator 302 that provides an output to an average short-term fading estimator 303 and an average calculator 306, both of which are coupled to a power control command unit (PCCU) 301. RCU 320 estimates relevant parameters and generate a CMD for each power control cycle. Received power estimator 302 receives an input signal and estimates the power of the received signal as a function of time, denoted RP(t), which may be averaged by average calculator 306 over a control cycle of duration $T_P$ to determine the parameter $\overline{RP}[k]$. Average short-term fading estimator 303 estimates the short-term channel fading and averages the short-term channel fading over a control cycle to determine the parameter $\overline{SF}[k]$. PCCU 301 receives parameters $\overline{RP}[k]$, $\overline{SF}[k]$, $RP_0$ and $\Delta_P$ to generate a CMD, wherein $\overline{RP}[k]$ is an estimate of the average received power over the $k^{th}$ power control cycle, $\overline{SF}[k]$ is an estimate of average short-term fading over the $k^{th}$ power control cycle, $RP_0$ is a preset desired power level, and $\Delta_P$ is the size of an adjustment step (in dB) for the transmitter power.

When the value of CMD is one other than a predetermined value indicating a transmission suspension mode, the CMD indicates the number of steps (in dB) to increase or decrease the transmitter power. This is referred to as a normal transmission mode. As shown in FIG. 2A, the CMD is provided to TCU 220 to adjust the transmitter power. When the value of the CMD is the same as the predetermined value indicating a suspended transmission mode, TSU 202 may suspend signal transmission. PCCU 301 generates the CMD based on the following criteria:

In a normal transmission mode:
1. CMD set to a value of +1, when $\overline{RP}[k]<RP_0$ and $\overline{SF}[k] \geq X_0$; and
2. CMD set to a value of −1, when $\overline{RP}[k] \geq RP_0$ and $\overline{SF}[k] \geq X_0$.

In a suspended transmission mode:
3. CMD set to a value "suspend", when $\overline{SF}[k]<X_0$ (for example, CMD is set to a value of −2).

Wherein $\overline{RP}[k]$ denotes the estimated average received power and $\overline{SF}[k]$ denotes the estimated average short-term fading over the $k^{th}$ control cycle. $RP_0$ represents the present desired received power level, and $X_0$ represents a preset threshold for channel quality. As described above, the normal mode means that the communication channel conditions are remained at a metric quality above a preset threshold or the commanded transmitter power is maintained below a preset maximum value.

Figure 4:
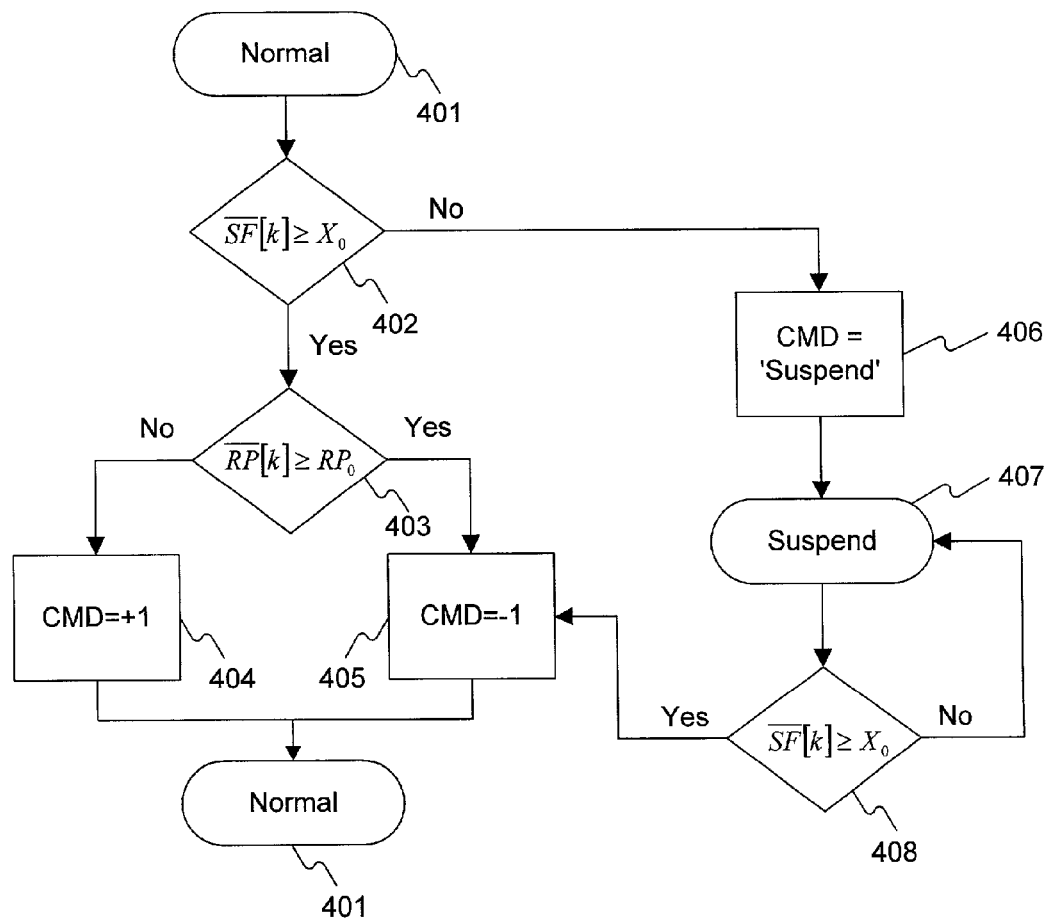
FIG. 4 is an exemplary flow chart of a power control command unit used in a receiver control unit for a strength-based power control.

FIG. 4 is a flow chart of PCCU 301 of the present invention used in a receiver control unit for strength-based power control. Referring to FIG. 4, a normal transmission mode is initially set (step 401). If the average short-term fading meets or exceeds the predefined threshold $X_0$ (step 402), and if the average received power $\overline{RP}[k]$ does not exceed the preset desired received power $RP_0$ (step 403), then the CMD is set to a value of +1 (step 404) and the system will remain in the normal transmission mode. If the average short-term fading meets or exceeds the predefined threshold $X_0$ (step 402), and if the average received power meets or exceeds the preset desired receiver power $RP_0$ (step 403), then the CMD is set to a value of −1 (step 405) and the system will remain in the normal transmission mode. If, however, the average short-term fading does not meet or exceed the predefined threshold $X_0$ (step 402), the CMD is set to a predetermined value to indicate a "suspend" mode (step 406), and transmission may be suspended (step 407) until the channel quality improves. When the average short-term fading meets or exceeds the predefined threshold $X_0$ (step 408), then the CMD is reset to a value of −1 (step 405) and the system may return to the normal transmission mode.

Because there are at least three possible values for the CMD, at least 2 bits are required to represent a CMD value. For example, "01" may represent CMD=+1, "10" may represent CMD=−1, and "11" may represent CMD=−2 to indicate a "suspend" mode.

Referring to FIG. 2A, TSU 202 may suspend transmission if a "suspend" CMD is received from PCCU 301. The control logic for the TSU 202 is as follows:
if CMD="suspend", then
freeze the value of TP[k],
suspend transmission for this power control cycle, otherwise
transmit signal with power of TP[k] for this power control cycle.

Wherein TP[k] denotes the commanded transmitter power for the remote terminal for the $k^{th}$ power control cycle.

Figure 3A:
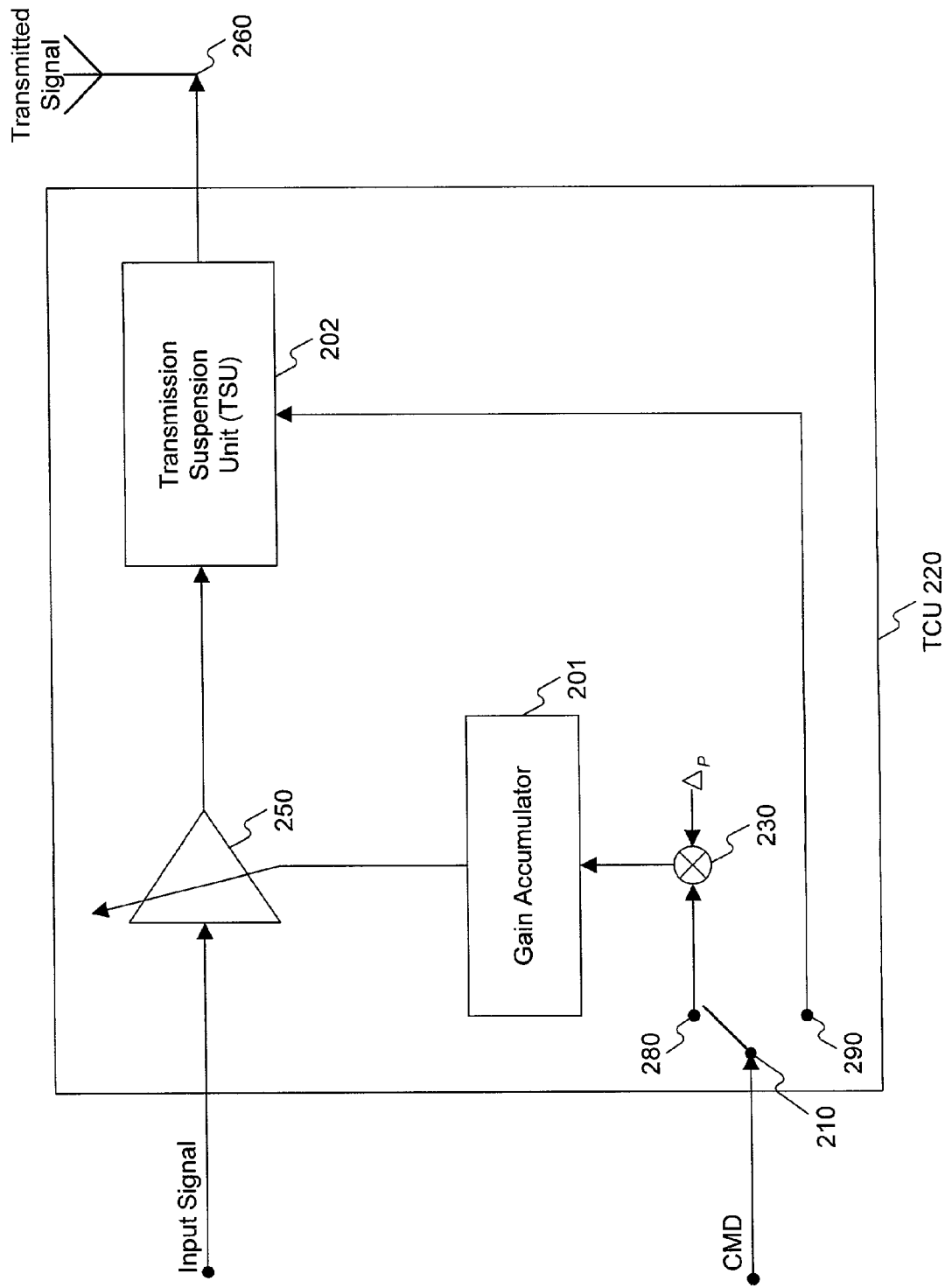
FIG. 3A is a block diagram of an exemplary transmitter control unit for a signal-to-interference ratio-based power control.
Figure 3B:
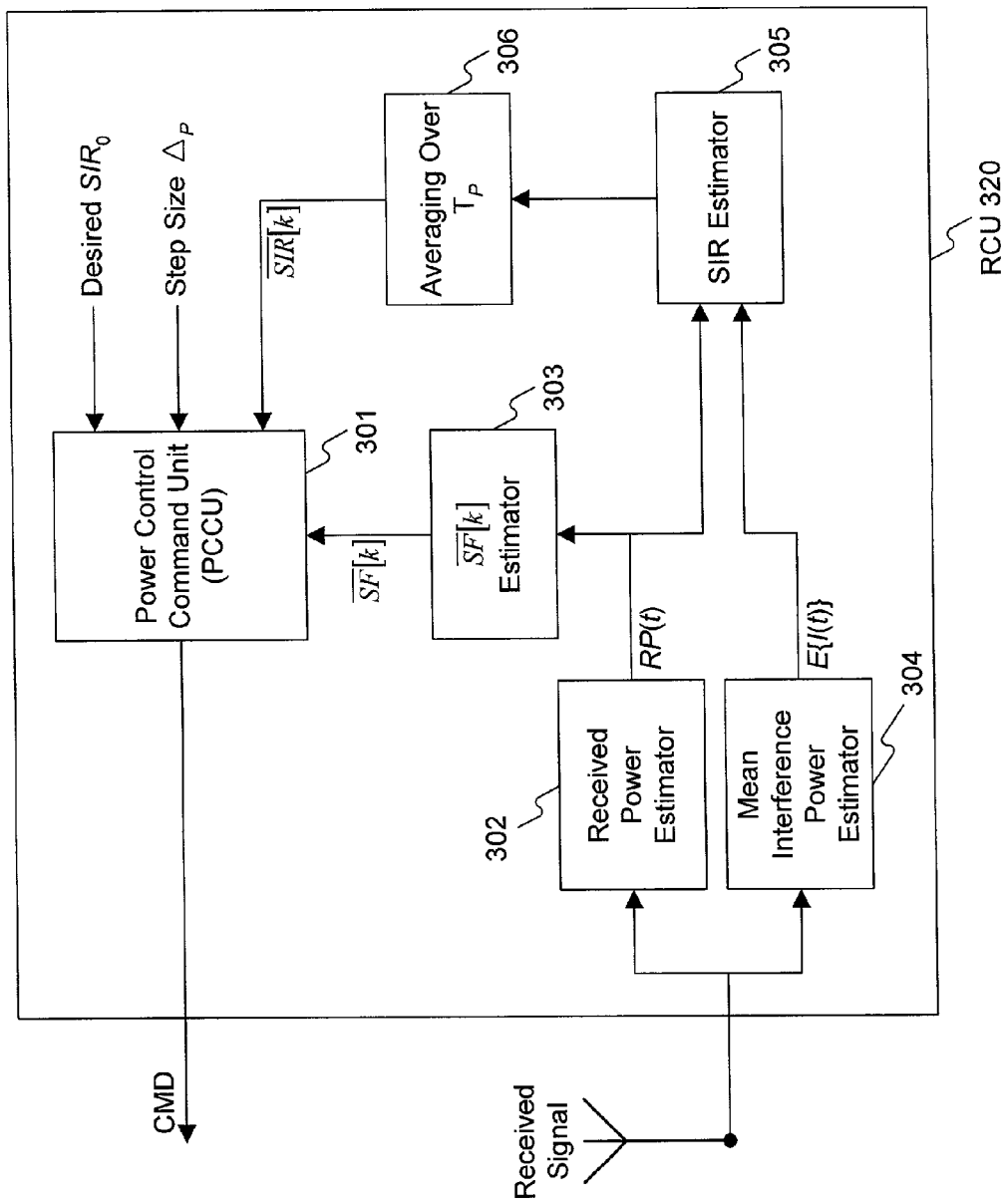
FIG. 3B is a block diagram of an exemplary receiver control unit for a signal-to-interference ratio-based power control.

FIG. 3A and FIG. 3B are block diagrams of a transmitter control unit and a receiver control unit, respectively, in which the method of power-suspended closed-loop power control system for a signal-to-interference ratio (SIR) based power control may be implemented in accordance with an embodiment of the present invention. These figures show an exemplary closed-loop power control system to compensate for short-term fading in accordance with an embodiment of the invention.

Referring to FIG. 3A, a transmitter control unit (TCU) 220 for an SIR-based power control is generally the same as that of a TCU for a strength-based power control system. TCU 220 includes a variable-gain amplifier 250 that receives an input signal. Variable-gain amplifier 250 is coupled to a gain accumulator 201 and provides an output to a transmission suspension unit (TSU) 202. TSU 202 outputs a signal to an antenna 260. TCU 220 also includes a multiplier 230 that provides an output to gain accumulator 201. TCU 220 receives a CMD and functions to adjust transmitter power or suspend transmission of a transmitter in a CDMA wireless communication system (not shown). Multiplier 230 receives the CMD together with a preset step size $\Delta_P$, wherein $\Delta_P$ is the size of an adjustment step (in dB) for the transmitter power. Multiplier 230 provides an output to gain accumulator 201, which provides an input to variable-gain amplifier 250 to adjust the output signal. If the value of the CMD indicates a value other than a predetermined value indicating a transmission suspended mode, a switch 210 switches to a first position 280 and establishes electrical connection between the source of the CMD and multiplier 230. Multiplier 230 receives the CMD together with a preset step size $\Delta_P$, wherein $\Delta_P$ is the size of an adjustment step (in dB) for the transmitter power. Multiplier 230 provides an output to gain accumulator 201, which provides an input to variable-gain amplifier 250 to adjust the output signal. If the value of the CMD is a predetermined value indicating a suspended transmission mode, switch 210 switches to a second position 290 and establishes electrical connection between the source of the CMD and TSU 202, which determines whether to suspend transmission.

Referring to FIG. 3B, a receiver control unit (RCU) 320 includes a received power estimator 302 and an average short-term fading estimator 303, a long-term average interference power estimator 304 and an SIR estimator 305. Received power estimator 302 and long-term average interference power estimator 304 receive a signal. Long-term average interference power estimator 304 estimates the long-term average power $E\{I(t)\}$ of the interference affecting the received signal as a function of time and provides the long-term average interference power to SIR estimator 305.

SIR estimator 305 determines the SIR from the estimated received power, RP(t), received from received power estimator 302, and the estimated long-term average interference power, E{I(t)}. The estimated SIR may be averaged by a calculating means 306 over the duration of a control cycle, $T_P$, to determine an average SIR value for the $k^{th}$ control cycle, denoted $\overline{SIR}[k]$. A power control command unit (PCCU) 301 generates a power control command (CMD) based on the estimated average SIR value $\overline{SIR}[k]$, the estimated average short-term fading $\overline{SF}[k]$, the step size $\Delta_P$, and a desired SIR power level $SIR_0$. The CMD is then sent to TCU 220 to adjust the transmitter power accordingly.

Figure 5A:
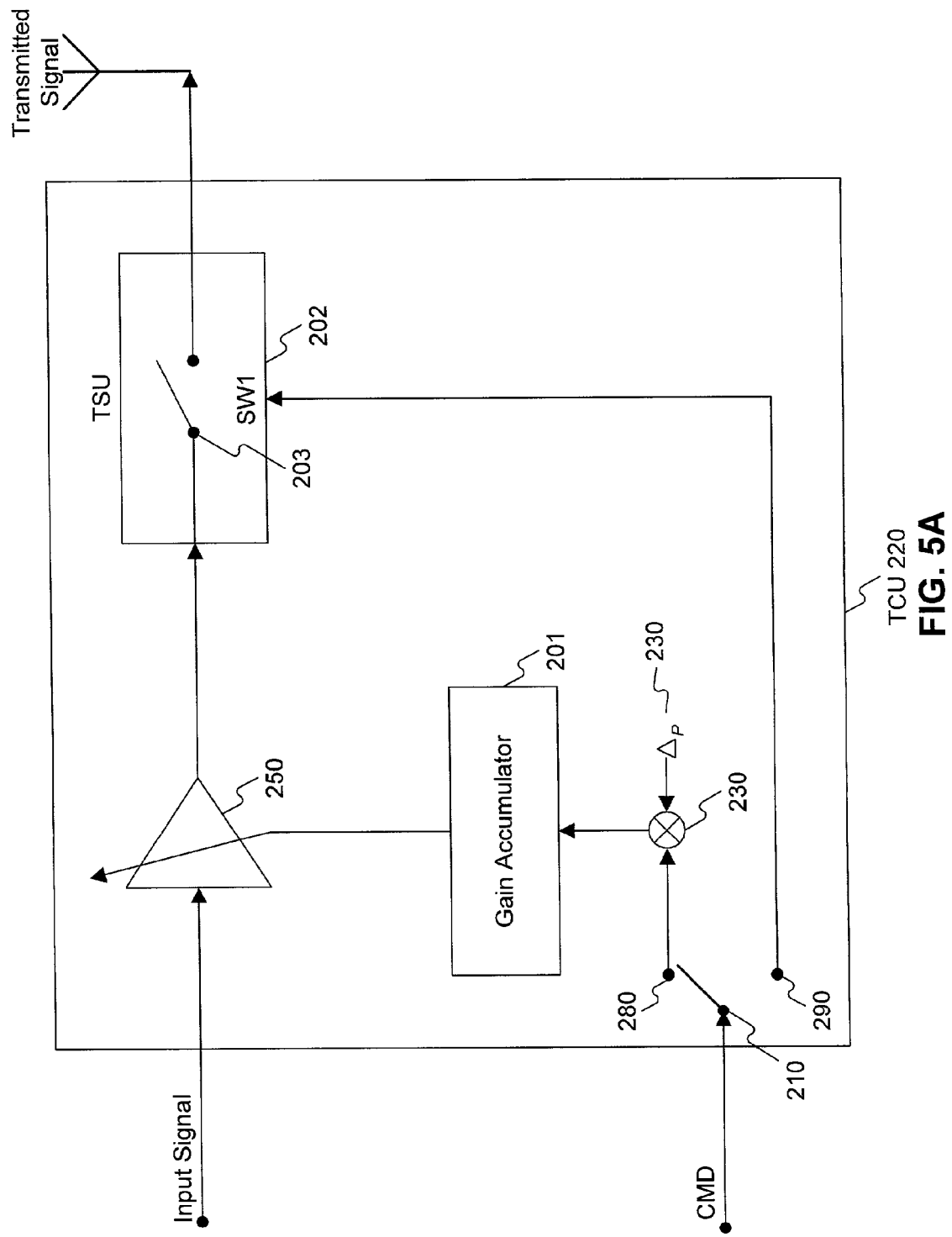
FIG. 5A is a block diagram of an exemplary transmitter control unit for both strength-based and signal-to-interference ratio-based power controls.

FIG. 5A is a block diagram of a transmitter control unit of a power-suspended closed-loop power control system for both strength-based and SIR-based power controls in accordance with another embodiment of the present invention. FIG. 5A and FIG. 2A are identical except for TSU 202 of FIG. 5A, which additionally includes a switch 203. Switch 203 is closed in the normal transmission mode and opened when transmission is suspended.

Figure 5B:
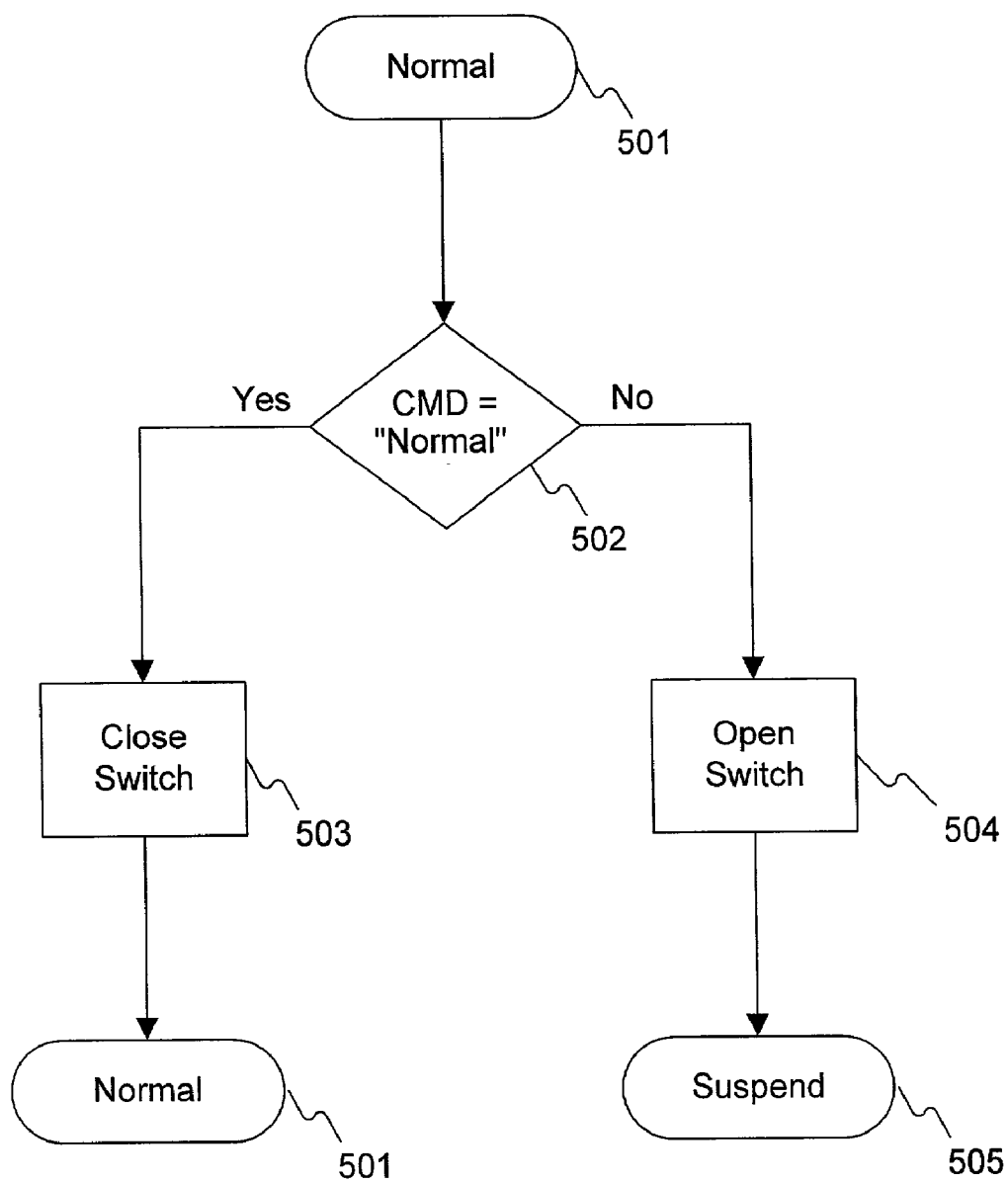
FIG. 5B is an exemplary flow chart of a transmission suspension unit in a transmitter control unit for both strength-based and signal-to-interference ratio-based power controls.

FIG. 5B is a flow chart of TSU 202 consistent with the embodiment shown in FIG. 5A. Referring to FIG. 5B, the transmission mode is initially set to "normal" transmission (step 501). When the value of CMD indicates a mode other than suspended transmission mode (step 502), then the TSU 202 closes switch 203 (step 503) and the system remains in the "normal" mode (step 501). When the value of CMD is one indicating suspended transmission mode, TSU 202 opens switch 203 (step 504) to suspend transmission and enters the suspended transmission mode (step 505). The "suspend" mode will be maintained until a CMD having a value other than one indicating suspended transmission mode is received. For an SIR-based power control, the PCCU 301 logic may be described as follows:

For normal transmission mode:
1. CMD=+1, when $\overline{SIR}[k]<SIR_0$ and $\overline{SF}[k]\geq X_0$,
2. CMD=-1, when $\overline{SIR}[k]\geq SIR_0$ and $\overline{SF}[k]\geq X_0$; and
3. CMD="suspend", when $\overline{SF}[k]<X_0$.

For suspended transmission mode:
1. CMD="suspend", when $\overline{SF}[k]<X_0$; and
2. CMD=-1, when $\overline{SF}[k]\geq X_0$ (switches to normal transmission mode).

wherein $\overline{SIR}[k]$ denotes the estimated average SIR over the $k^{th}$ control cycle, and $SIR_0$ is a preset desired SIR level chosen to guarantee a certain level of communication quality.

Figure 6:
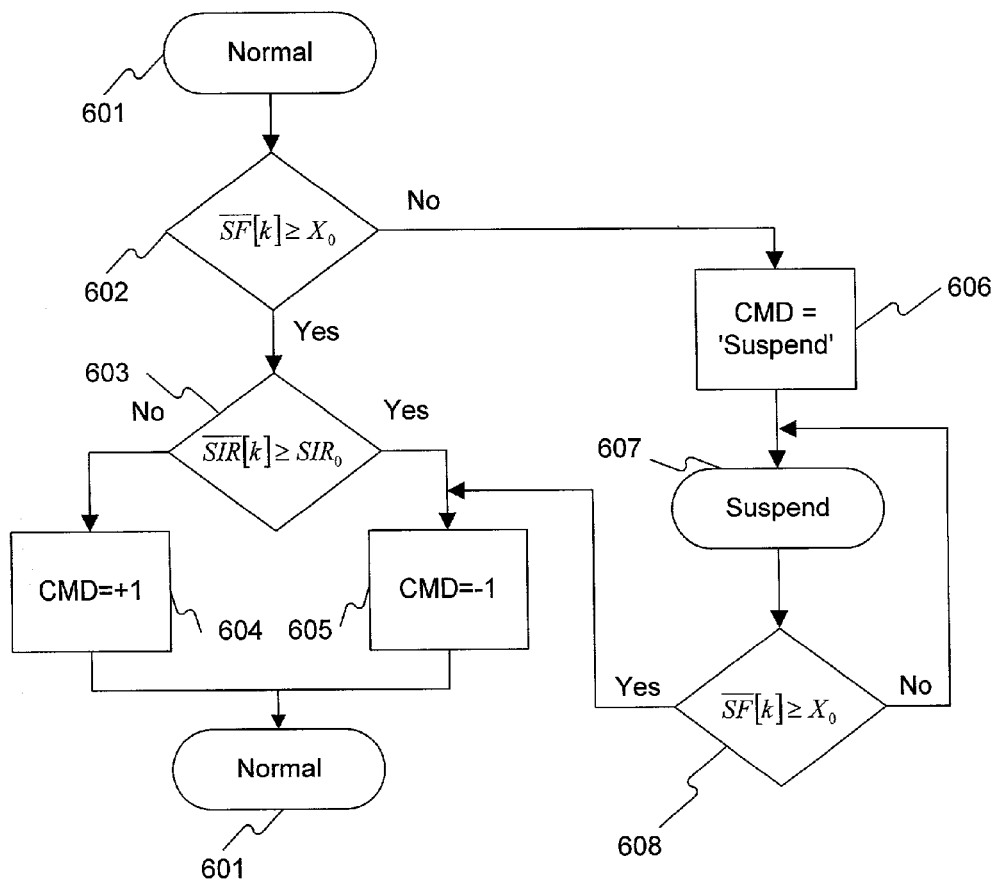
FIG. 6 is an exemplary flow chart of a power control command unit used in a receiver control unit for a signal-to-interference ratio-based power control system.

FIG. 6 is a flow chart of a power control command unit used in a receiver control unit for a signal-to-interference ratio (SIR) based power control system. The control logic is similar to the strength-based power control, except that $\overline{SIR}[k]$ and $SIR_0$ replace $\overline{RP}[k]$ and $RP_0$, respectively. Referring to FIG. 6, the transmission mode is initially set to "nornal" (step 601). If the average short-term fading meets or exceeds the predefined threshold $X_0$ (step 602), and if the average SIR fails to meet or exceed the preset desired SIR threshold $SIR_0$ (step 603), then the power control command CMD is set to a value of +1 (step 604) and the system remains in "normal" operating mode (step 601). If the average SIR meets or exceeds the preset desired SIR threshold $SIR_0$, then CMD is set to a value of -1 (step 605) and the system remains in "normal" operating mode (step 601).

When the average short-term fading does not meet or exceed the predefined threshold $X_0$ (step 602), the CMD is set to a predetermined value indicating suspended transmission mode (step 606), and transmission may be suspended (step 607) until the channel quality improves. When the average short-term fading meets or exceeds the predefined threshold $X_0$ (step 608), PCCU 301 generated CMD is reset to a value of -1 (step 605) and the system returns to "normal" operating mode. Because there are three possible values for the CMD, at least 2 bits are needed to represent the CMD. For example, "10" may represent CMD=+1, "10" may represent CMD=-1, and "11" may represent CMD="suspend".

Figure 7A:
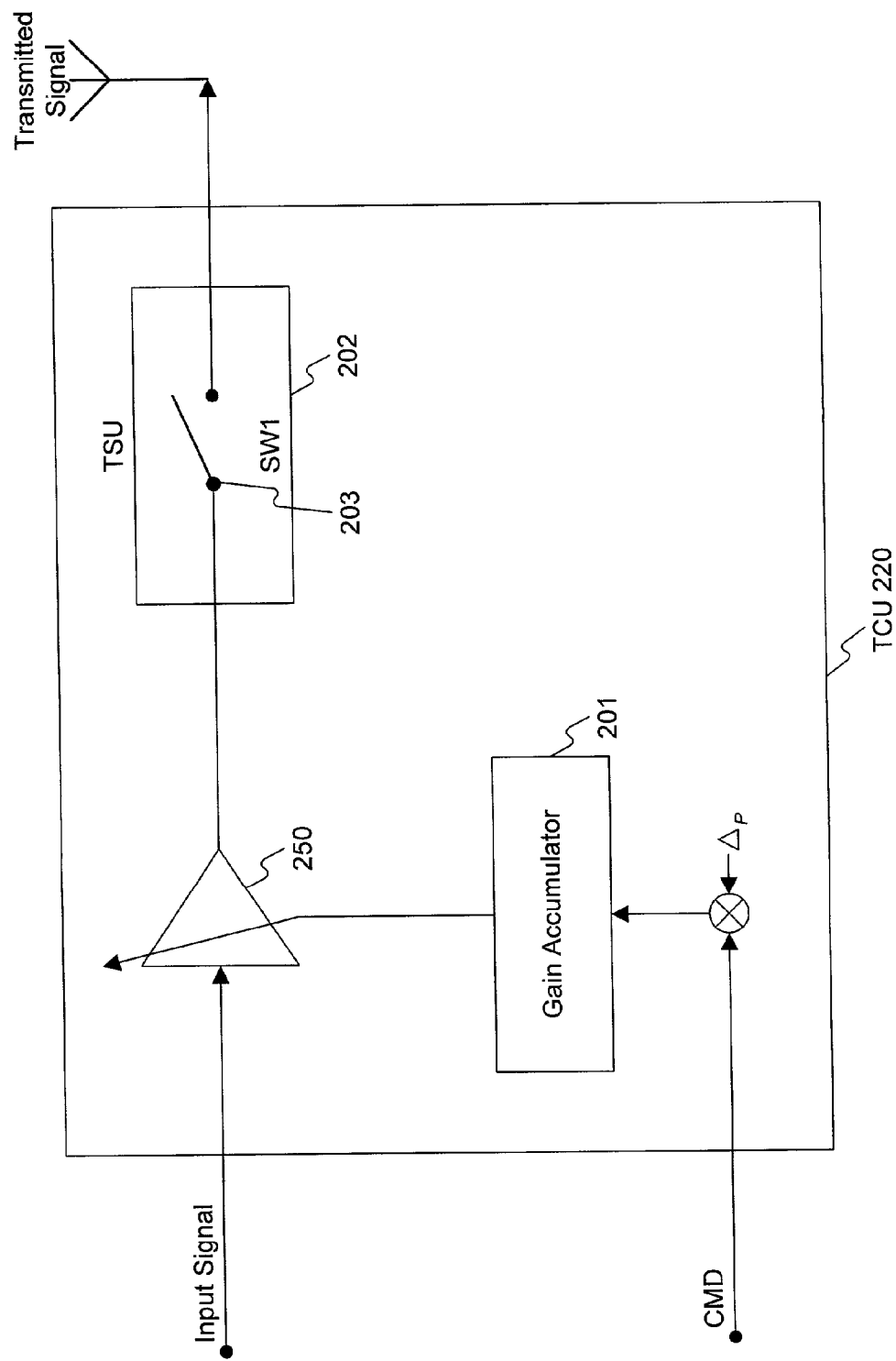
FIG. 7A is a block diagram of an exemplary transmitter control unit for both strength-based and signal-to-interference ratio-based power controls.

FIG. 7A is a block diagram of a transmitter control unit of a power-suspended closed-loop power control scheme for both strength-based and SIR-based power controls in accordance with another embodiment of the present invention. Referring to FIG. 7A, TCU 220 is similar to the embodiment shown in FIG. 5A, except that the TCU 220 shown in FIG. 7A does not include switch 210.

Figure 7B:
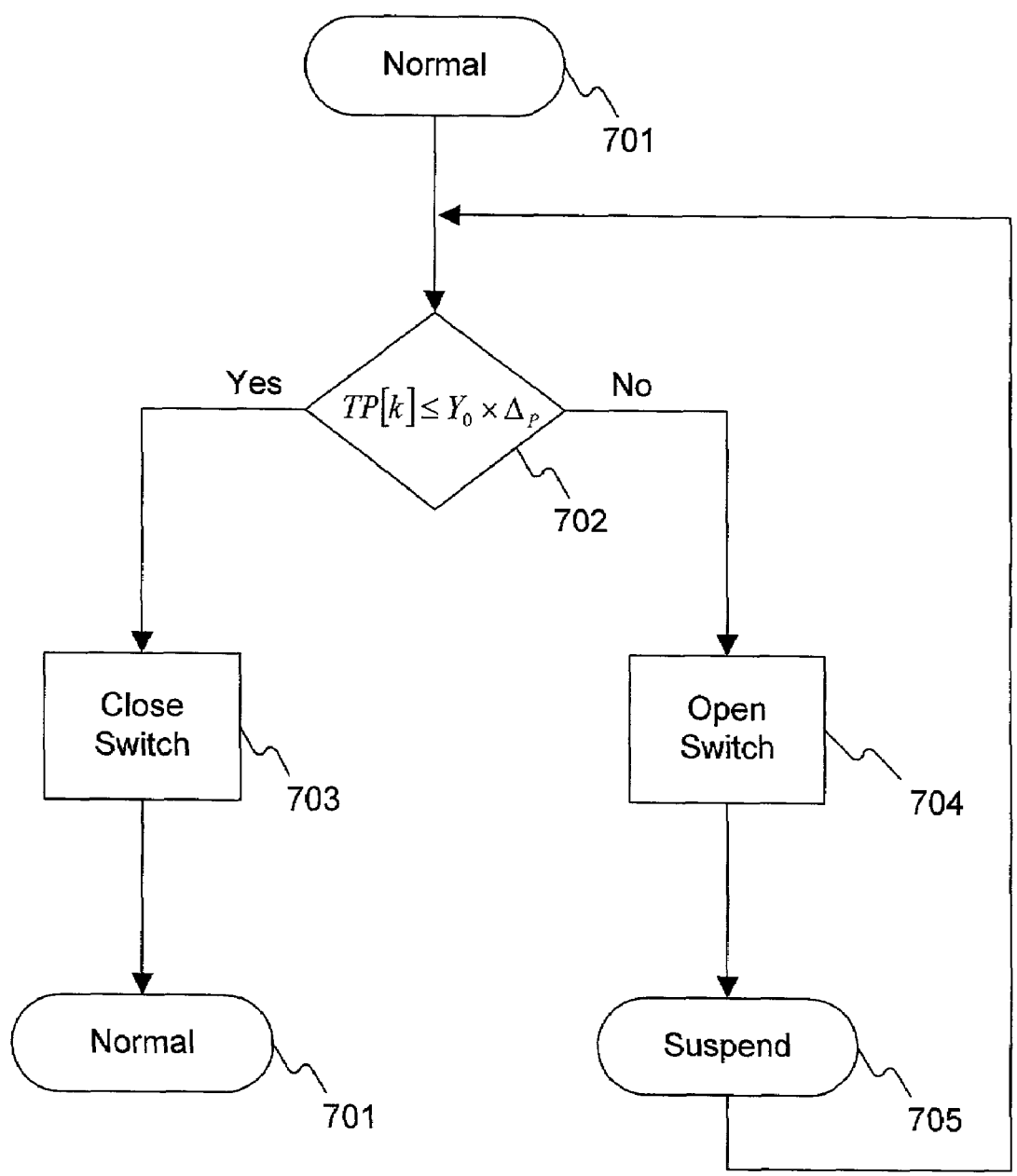
FIG. 7B is an exemplary flow chart of a transmission suspension unit in a transmitter control unit for both strength-based and signal-to-interference ratio-based power controls.

FIG. 7B is a flow chart for TSU 202 consistent with the embodiment shown in FIG. 7A. Referring to FIG. 7B, the transmission mode is initially set to "normal" (step 701). If the transmitter power level is less than a calculated threshold, i.e. $TP[k]\leq 10^{0.1\times Y_0\times \Delta_P}$, wherein $Y_0$ is a predefined number, then switch 203 is closed (step 703) and the system remains in the normal transmission mode (step 701). If the transmitter power level exceeds the calculated threshold, i.e. $TP[k]>10^{0.1\times Y_0\times \Delta_P}$ (step 702), switch 203 is opened (step 704) to suspend transmission (step 705) and freeze the value of TP[k]. Transmission remains suspended (step 705) and the value of TP[k] remains constant until a CMD less than zero is received, indicating that required transmitter power is within an acceptable range, i.e. $TP[k]\leq 10^{0.1\times Y_0\times \Delta_P}$. Hence suspension of transmission terminates when switch 203 is closed (step 703) and the system returns to the "normal" operation (step 701).

Figure 8:
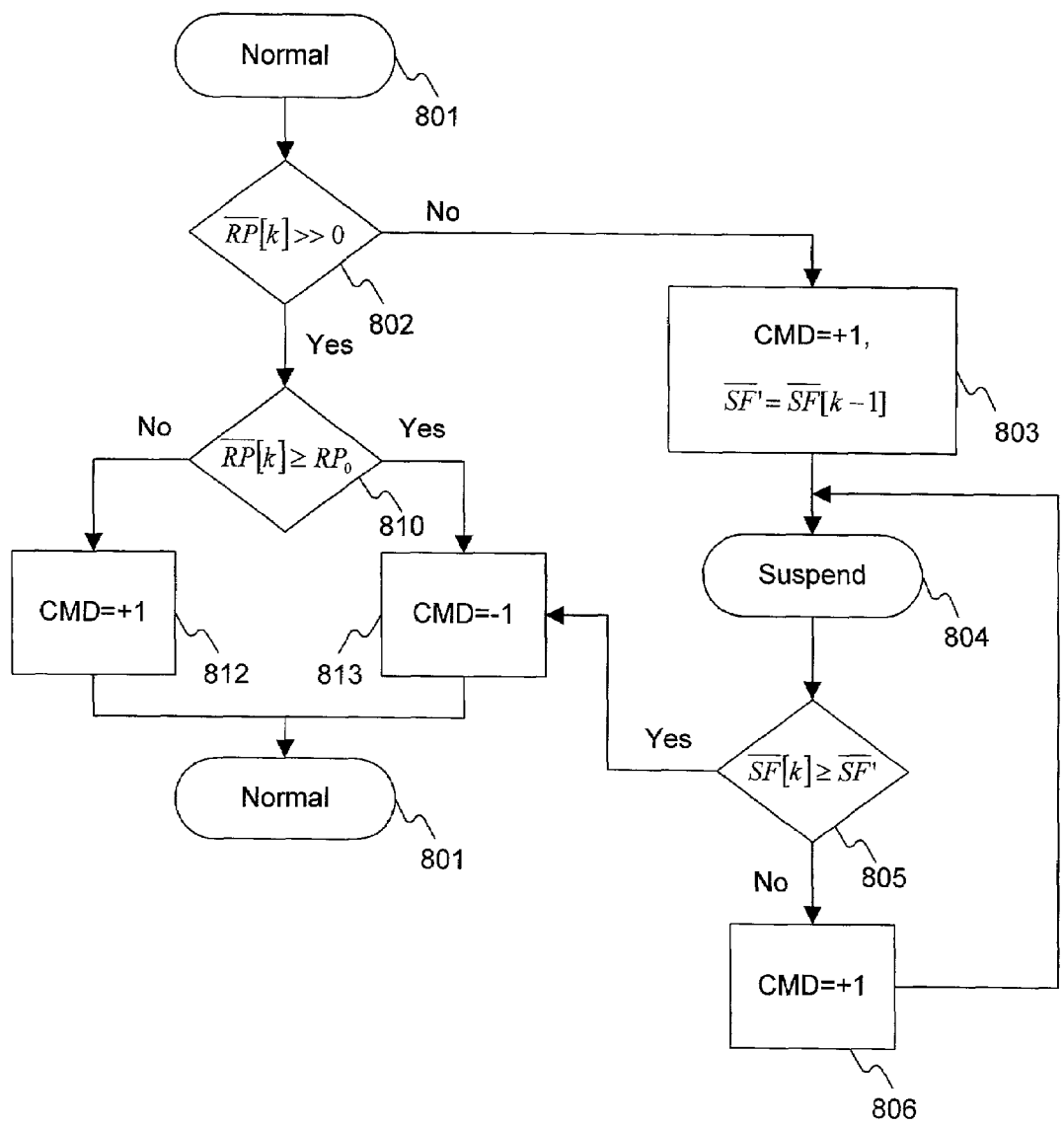
FIG. 8 is an exemplary flow chart of a power control command unit used in a receiver control unit for a strength-based power control.

FIG. 8 is a flow chart of a power control command unit used in a receiver control unit for strength-based power control in accordance with an alternative embodiment. For this embodiment, PCCU 301 logic for power control may be described as follows:

For a normal transmission mode:
1. CMD=+1, when $\overline{RP}[k]<RP_0$,
2. CMD=-1, when $\overline{RP}[k]\geq RP_0$,
3. CMD=+1, $\overline{SF}'=\overline{SF}[k-1]$, when $\overline{RP}[k]\approx 0$, For a suspended transmission mode:
1. CMD=+1, when $\overline{SF}[k]<\overline{SF}'$,
2. CMD=-1, when $\overline{SF}[k]\geq \overline{SF}'$ (resumes normal transmission mode).

In the alternative TCU 220 embodiment, the CMD may take on one of two different values. Therefore, a single bit may represent a CMD. For example, "1" may represent CMD=+1 and "0" may represent CMD=-1.

Referring to FIG. 8, PCCU 301 is initially set to "normal" mode (step 801). Power control may be determined and the CMD may be generated as in the embodiments described above, except when the average received power is very small, i.e. $\overline{RP}[k]\approx 0$ (step 802). If $\overline{RP}[k]$ is much greater than zero, i.e., $\overline{RP}[k]>>0$ (step 802), and $\overline{RP}[k]\geq RP_0$ (step 810), then the value of CMD is set to -1 (step 813) and the transmission mode is maintained at the "normal" mode (step 801). When $RP[k]<RP_0$, CMD is set of a value of +1 (step 812) and the transmission mode is also maintained at the "normal" mode (step 801). A determination $\overline{RP}[k]\approx 0$ (step 802) indicates that the transmission is suspended. Thus, CMD is set to a value of +1, variable SF is set, i.e., $\overline{SF}'=\overline{SF}[k-1]$ (step 803), and transmission is switched to "suspend" mode (step 804). The index "k-1" denotes the previous control cycle. A power control command of +1 may be sent (step 806) until the channel quality recovers, i.e. $\overline{SF}[k] \geq \overline{SF}'$ (step 805). When the channel quality recovers (step 805), the CMD is set to a value of −1 (step 813) to direct the system to resume transmission to return to the "normal" mode (step 801).

The alternative embodiment of TCU 220 described above is also applicable to SIR-based power control. The block diagram of TCU 220 and the flow diagram for TSU 202 may be the same as those shown FIGS. 7A and 7B. The control logic for PCCU 301 is obtained by replacing $\overline{RP}[k]$ with $\overline{SIR}[k]$, and $RP_0$ with $SIR_0$, respectively:

For normal transmission mode:
1. CMD=+1, when $\overline{SIR}[k]<SIR_0$,
2. CMD=−1, when $\overline{SIR}[k] \geq SIR_0$, and
3. CMD=+1, and $\overline{SF}'=\overline{SF}[k-1]$, when $\overline{RP}[k] \approx 0$ (operation switches to "suspended" mode).

For suspended transmission mode:
1. CMD=+1, when $\overline{SF}[k]<\overline{SF}'$, and
2. CMD=−1, when $\overline{SF}[k] \geq \overline{SF}'$ (resumes normal transmission mode).

Figure 9:
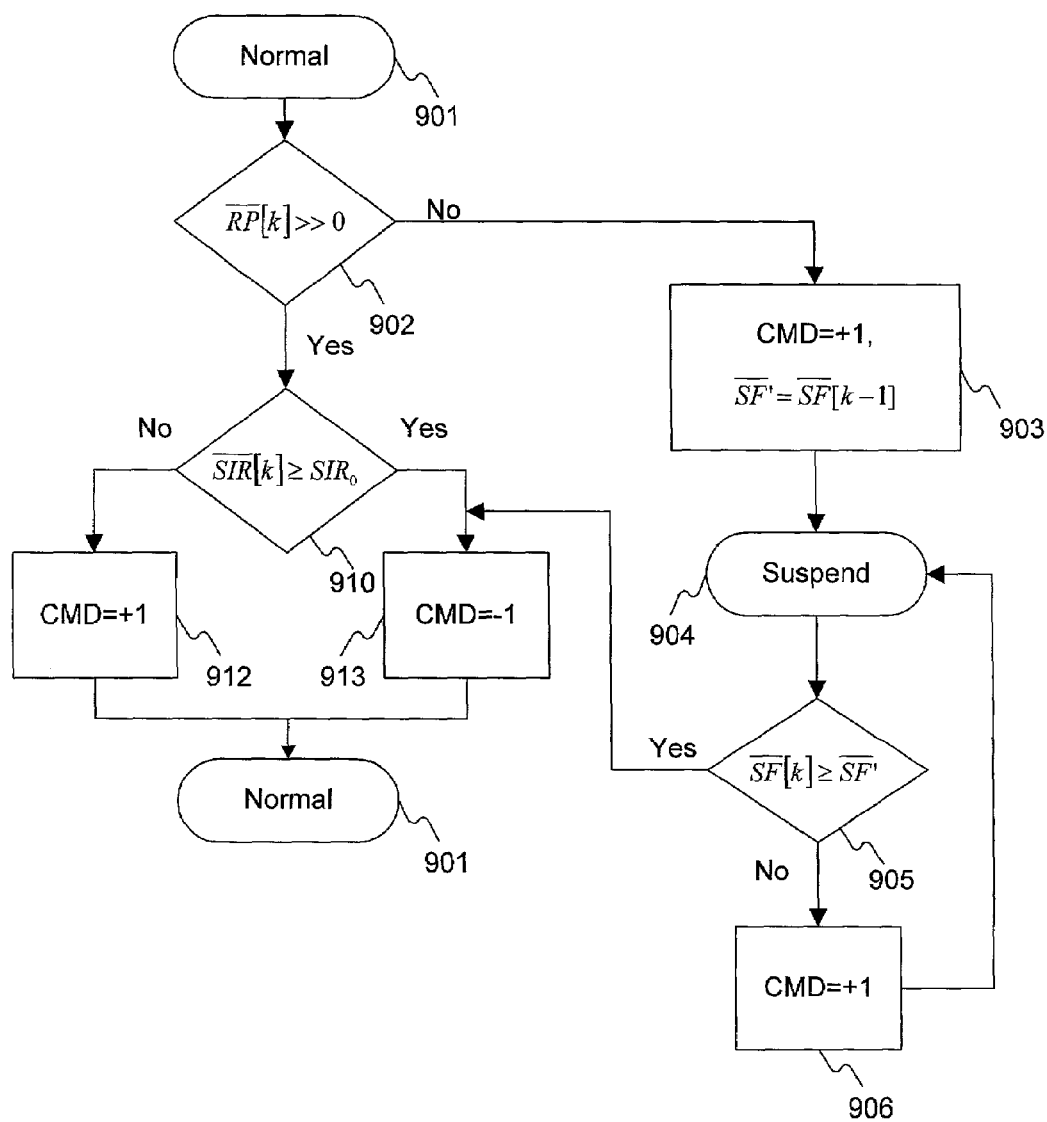
FIG. 9 is an exemplary flow chart of a power control command unit used in a receiver control unit for a signal-to-interference ratio-based power control.

FIG. 9 is a flow chart of a power control command unit used in a receiver control unit for signal-to-interference ratio-based power control in accordance with another embodiment of the present invention. The control logic process shown in steps 901-906 is similar to the control logic process shown in steps 801-806 of FIG. 8 for the strength-based power control. Referring to FIG. 9, PCCU 301 mode is initially set to "normal" (step 901). Power control may be determined and the CMD may be generated as in the first embodiment described above, except when the average received power is very small, i.e. $\overline{RP}[k] \approx 0$ (step 902). If $\overline{RP}[k] >> 0$ (step 902) and $\overline{SIR}[k] \geq SIR_0$ (step 910), then the value of CMD is set to −1 (step 913) and the transmission mode is maintained as "normal" (step 901). Otherwise, when $\overline{SIR}[k]<SIR_0$, the value of CMD is set to +1 (step 912) and the transmission mode is maintained as "normal" (step 901). A determination that $\overline{RP}[k] \approx 0$ (step 902) implies that transmission is suspended. The CMD is set to a value of +1, variable SF' is set, i.e., $\overline{SF}'=\overline{SF}[k-1]$ (step 903), and transmission is switched into "suspend" mode (step 904). The index "k−1" denotes the previous control cycle. A power control command of +1 may be sent (step 906) until the channel quality recovers, i.e. $\overline{SF}[k] \geq \overline{SF}'$ (step 905). When the channel quality recovers (step 905), the CMD is set to −1 (step 913) to direct the system to resume transmission and PCCU 301 mode returns to "normal" mode (step 901).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling transmitter power of a signal transmitted from a transmitter to a receiver over a first communication channel in a code-division multiple-access wireless communication system, comprising:
   receiving the signal at the receiver;
   sending a power control command from the receiver to the transmitter over a second communication channel, the power control command being set to a specific value when a first quality metric of short-term fading of the first communication channel is lower than a first threshold wherein a power control command being set further comprises:
     setting the power control command to be a first value to instruct the transmitter to increase the transmitting power level and memorizing a second quality metric of a short-term fading of the first communication channel if the first quality metric of the received signal is near zero; and
     setting the power control command to be a second value to instruct the transmitter to decrease the transmitting power level so that the suspended transmission will be resumed if the first quality metric of the received signal is near zero and the second quality metric of the short-term fading of the first communication channel is higher than the memorized second quality metric;
   adjusting the transmitter power in accordance with the power control command that has a value other than the specific value; and
   suspending transmission of the signal, at the transmitter, when the power control command is equal to the specific value.

2. The method as claimed in claim 1, wherein when the first quality metric of short-term fading of the first communication channel is higher than the first threshold, the power control command is determined according to the second quality metric of the received signal and a second threshold.

3. The method as claimed in claim 2, wherein the second quality metric is an average signal-to-interference ratio of the received signal over a power control cycle.

4. The method as claimed in claim 1, wherein the first quality metric is an estimated average of short-term fading of the first communication channel over a power control cycle.

5. The method as claimed in claim 2, wherein the second quality metric is an average power of the received signal over a power control cycle.

6. The method as claimed in claim 2, wherein the power control command is determined by
   setting the power control command to a first value to instruct the transmitter to increase the transmitter power of the signal if the second quality metric of the received signal is lower than the second threshold;
   setting the power control command to a second value to instruct the transmitter to decrease the transmitter power of the signal if the second quality metric of the received signal is higher than the second threshold.

7. A method for controlling a transmitter power of a signal transmitted from a transmitter to a receiver over a first communication channel in a code-division multiple-access wireless communication system, comprising:
   receiving the signal at the receiver;
   adjusting the transmitting power level at the transmitter, according to a power control command transmitted by the receiver over a second communication channel;
   transmitting the signal according to the adjusted transmitting power level when the adjusted transmitting power level is less than a first threshold;
   suspending transmission of the signal when the adjusted transmitting power level is greater than the first threshold; and
   generating the power control command, at the receiver, by:
     setting the power control command to be a first value to instruct the transmitter to increase the transmitting power level and memorizing a second quality metric of a short-term fading of the first communication channel if the first quality metric of the received signal is near zero; and
     setting the power control command to be a second value to instruct the transmitter to decrease the transmitting power level so that the suspended transmission will be resumed if the first quality metric of the received signal is near zero and the second quality metric of the short-term fading of the first communication channel is higher than the memorized second quality metric.

8. The method as claimed in claim 7, wherein when the first quality metric of the received signal is much higher than zero, the power control command is determined according to the first quality metric of the received signal and a second threshold.

9. The method as claimed in claim 8, wherein the power control command is determined by
setting the power control command to a third value to instruct the transmitter to increase the transmitting power level if the first quality metric of the received signal is lower than the second threshold; and
setting the power control command to a fourth value to instruct the transmitter to decrease the transmitting power level if the first quality metric of the received signal is higher than the second threshold.

10. The method as claimed in claim 7, wherein the first quality metric of the received signal is an average signal-to-interference ratio of the received signal over a power control cycle.

11. The method as claimed in claim 7, wherein the first quality metric of the received signal is an average power of the received signal over a power control cycle.

12. The method as claimed in claim 7, wherein the transmitting power level is frozen until a power control command indicating to decrease the transmitting power level is received when the transmission of the signal has been suspended at the transmitter.

13. The method as claimed in claim 7, wherein the second quality metric is an estimated average short-term fading of the first communication channel over a power control cycle.

14. A transmitter control unit that controls a transmitter power signal to be transmitted from a transmitter to a receiver over a first communication channel in a code-division multiple-access wireless communication system, comprising:
a switching unit for receiving a power control command, that is issued by the receiver over a second communication channel, outputting the received power control command at a node $N_A$ when the received power control command equals to a specific value, and otherwise, outputting the received power control command at a node $N_B$;
a multiplier for multiplying the received power control command at node $N_B$ and a preset step size;
a gain accumulator having an input and an output, wherein the input is coupled to the multiplier to receive an output from the multiplier;
an amplifier, coupled to the gain accumulator, receiving the signal, wherein the gain of the amplifier is controlled in accordance with the output of the gain accumulator; and
a transmission suspension unit coupled to the amplifier for determining whether to suspend transmission based on whether or not the received power control command is the specific value.

15. A receiver control unit at a receiver that receives a signal transmitted from a transmitter over a first communication channel and generates a power control command as feedback to the transmitter over a second communication channel, the receiver control unit comprising:
a first estimator for estimating a first quality metric of a short-term fading of the first communication channel;
a second estimator for estimating a second quality metric of the received signal; and
a power control command unit for generating the power control command based on the first and second quality metrics, wherein the power control command is set to a specific value to instruct the transmitter to suspend transmission when a first quality metric is lower than a first threshold.

16. The receiver control unit of claim 15, wherein when the first quality metric is higher than the first threshold, the power control command is generated according to the second quality metric of the received signal and a second threshold.

17. The receiver control unit of claim 16, wherein the power control command is generated by
setting the power control command to a first value to instruct the transmitter to increase the transmitter power of the signal if the second quality metric of the received signal is lower than the second threshold;
setting the power control command to a second value to instruct the transmitter to decrease the transmitter power of the signal if the second quality metric of the received signal is higher than the second threshold.

18. The receiver control unit of claim 15, wherein the first quality metric is an estimated average short-term fading of the first communication channel over a power control cycle.

19. The receiver control unit of claim 15, wherein the second quality metric is an average signal-to-interference ratio of the received signal over a power control cycle.

20. A transmitter control unit that controls a transmitter power of a signal to be transmitted from a transmitter to a receiver over a first communication channel in a code-division multiple-access wireless communication system, comprising:
a multiplier for multiplying a received power control command, issued by the receiver over a second communication channel, and a preset step size;
a gain accumulator coupled to the multiplier to receive an output from the multiplier;
an amplifier, coupled to the gain accumulator, receiving the signal to be transmitted by the transmitter, wherein the gain of the amplifier is controlled in accordance with an output of the gain accumulator; and
a transmission suspension unit coupled to the amplifier for determining to suspend transmission based on whether or not the transmitter power of the signal is higher than a preset threshold.

* * * * *